(12) United States Patent
Kawamura et al.

(10) Patent No.: US 6,493,769 B1
(45) Date of Patent: Dec. 10, 2002

(54) STREAM INFORMATION PROCESSING AND METHOD AND PROVIDING MEDIUM

(75) Inventors: Harumi Kawamura, Tokyo (JP); Atsushi Endo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/385,388

(22) Filed: Aug. 30, 1999

(30) Foreign Application Priority Data

Sep. 1, 1998 (JP) .......................................... 10-246611

(51) Int. Cl.[7] .......................... G06F 13/20; G06F 13/28
(52) U.S. Cl. ................ 710/3; 710/8; 710/14; 710/33; 710/34; 710/35
(58) Field of Search ............................... 710/3, 33, 34, 710/35, 8, 14

(56) References Cited

U.S. PATENT DOCUMENTS

| 5,644,788 | A | * | 7/1997 | Courtright et al. | .......... 395/855 |
| 5,699,346 | A | * | 12/1997 | VanDervort | .................. 370/233 |
| 6,038,379 | A | * | 3/2000 | Fletcher et al. | .......... 395/200.6 |
| 6,058,439 | A | * | 5/2000 | Devereux | ..................... 710/52 |
| 6,108,734 | A | * | 8/2000 | Shand | ......................... 710/105 |
| 6,405,257 | B1 | * | 6/2002 | Gersht et al. | ................ 709/232 |

* cited by examiner

*Primary Examiner*—Jeffrey Gaffin
*Assistant Examiner*—Rehana Perveen
(74) *Attorney, Agent, or Firm*—Frommer Lawrence & Haug LLP; William S. Frommer; Hans R. Mahr

(57) ABSTRACT

When stream data is reproduced through an IEEE-1394 high-speed serial bus from a hard-disk apparatus serving as a source, and is transmitted as is to another hard-disk apparatus through the IEEE-1394 bus and recorded thereinto, if the data is transferred with the use of isochronous communication, entry_type is set to an isochronous track and if the data is transferred with the use of isochronous communication, entry_type is set to an asynchronous track. When the stream data is transmitted, a payload size which indicates the size of the steam data is written into a payload information block in order to obtain a bus channel and a bus bandwidth.

9 Claims, 24 Drawing Sheets

FIG. 5

| OFFSET | NAME | FUNCTION |
|---|---|---|
| 000h | STATE_CLEAR | INDICATES STATE AND CONTROL INFORMATION |
| 004h | STATE_SET | SETS STATE_CLEAR BIT |
| 008h | NODE_IDs | INDICATES 16-BIT NODE ID |
| 00Ch | RESET_START | STARTS COMMAND RESET |
| 018h-01Ch | SPLIT_TIMEOUT | SPECIFIES MAXIMUM SPLIT TIME |
| 200h | CYCLE_TIME | INDICATES CYCLE TIME |
| 210h | BUSY_TIMEOUT | SPECIFIES RETRY LIMIT |
| 21Ch | BUS_MANAGER | INDICATES BUS-MANAGER ID |
| 220h | BANDWIDTH_AVAILABLE | INDICATES BANDWIDTH AVAILABLE TO ISOCHRONOUS COMMUNICATION |
| 224h - 228h | CHANNELS_AVAILABLE | INDICATES CONDITION OF USE OF EACH CHANNEL |

FIG. 7

| 400h | 04h | crc_length | rom_crc_value |
|---|---|---|---|

Bus_info_block

| 404h | "1394" |||
|---|---|---|---|
| 408h | irmc/cmc/isc/bmc reserved | cyc_clk_acc | max_rec | reserved |
| 40Ch | Company_ID || Chip_ID_hi |
| 410h | Chip_ID_lo |||

Root_directory

| 414h | root_length | CRC |
|---|---|---|
| 418h | 03h | module_vendor_id |
| 41Ch | 0Ch | node_capabilities |
| 420h | 8Dh | node_unique_id_offset |
| 424h | D1h | unit_directory_offset |
| 428h | | Optional. |

Unit_directory

| | unit_directory_length | CRC |
|---|---|---|
| | 12h | unit_spec_id |
| | 13h | unit_sw_version |
| | | Optional. |

FIG. 8

| | |
|---|---|
| 900h | Output Master Plug Register |
| 904h | Output Plug Control Register #0 |
| 908h | Output Plug Control Register #1 |
| ⋮ | ⋮ |
| 97Ch | Output Plug Control Register #30 |
| 980h | Input Master Plug Register |
| 984h | Input Plug Control Register #0 |
| 988h | Input Plug Control Register #1 |
| ⋮ | ⋮ |
| 9FCh | Input Plug Control Register #30 |

FIG. 9A oMPR

| data rate capability | broadcast channel base | non-persistent extension field | persistent extension field | reserved | number of output plugs |
|---|---|---|---|---|---|
| 2 | 6 | 8 | 8 | 3 | 5 (bit) |

FIG. 9B oPCR [n]

| on-line | broadcast connection counter | point-to-point connection counter | reserved | channel number | reserved | data rate | overhead ID | payload |
|---|---|---|---|---|---|---|---|---|
| 1 | 1 | 6 | 2 | 6 | 2 | 2 | 4 | 10 (bit) |

FIG. 9C iMPR

| data rate capability | reserved | non-persistent extension field | persistent extension field | reserved | number of input plugs |
|---|---|---|---|---|---|
| 2 | 6 | 8 | 8 | 3 | 5 (bit) |

FIG. 9D iPCR [n]

| on-line | broadcast connection counter | point-to-point connection counter | reserved | channel number | reserved |
|---|---|---|---|---|---|
| 1 | 1 | 6 | 2 | 6 | 16 (bit) |

FIG. 14

| generation_ID values | |
|---|---|
| generation_ID | meaning |
| $00_{16}$ | Data structures and command sets as specified in the AV/C General Specification, version 3.0 |
| all others | reserved for future specification |

| Address Offset | Contents |
|---|---|
| $00_{16}$ | disc_subunit_dependent_info_fields_length |
| $01_{16}$ | |
| $02_{16}$ | attributes |
| ⋮ | disc_subunit_version |
| ⋮ | number_of_supported_media_types(n) |
| ⋮ | supported_media_type_specification[0] |
| ⋮ | ⋮ |
| ⋮ | supported_media_type_specification[n-1] |
| ⋮ | optional info blocks for future expansion |

FIG. 16

| Attribute Value | Name | Meaning |
|---|---|---|
| 1xxx xxxx | has_more_attributes | If this bit is set to 1, then the next byte is also an attributes byte. If this bit is 0, then the next byte is as defined for this structure. |
| xxxx xxx1 | supports_copyright | If this bit is set to 1, then the subunit is able to honor the appropriate copyright rules when recording and playing back. If this bit is clear, then the subunit does not record copyrighted material. |
| all others | — | Reserved for future specification. |

FIG. 17

| disc_subunit_version | Meaning |
|---|---|
| $10_{16}$ | Version 1.0 of the disc subunit specification |
| all others | Reserved for future specification |

FIG. 18

| Address Offset | Contents |
|---|---|
| $00_{16}$ | supported_media_type |
| $01_{16}$ | |
| $02_{16}$ | implementation_profile_ID |
| $03_{16}$ | media_type_attributes |
| ⋮ | type_dependent_length |
| ⋮ | type_dependent_information |

FIG. 19

| supported_media_type (MSR) | Value | supported_media_type (LSB) | Value |
|---|---|---|---|
| CD | $01_{16}$ | CD-DA<br>reserved for Video-CD | $01_{16}$<br>$02_{16}$ |
| MD | $03_{16}$ | MD-Audio<br>reserved for Picture-MD | $01_{16}$<br>$02_{16}$ |
| all others | reserved | reserved | reserved |

FIG. 20

| Attribute Value | Name | Meaning |
|---|---|---|
| 1xxx xxxx | has_more_attributes | If this bit is set to 1, then the next byte is also an attributes byte. If this bit is 0, then the next byte is as defined for this structure. |
| xxxx xxx1 | can_record | If this bit is set to 1, the disc subunit has the ability to record on the specified supported media type. When this bit is clear, then this subunit is only able to play from the specified supported media type. |
| xxxx xx1x | supports_hierarchical_storage | If this bit is set to 1, then the subunit supports the hierarchical storage model on this media type. For more details, refer to the section titled Child Contents Lists on page 60. If this bit is clear, then the subunit supports only the flat storage model. |
| xxxx x1xx | supports_two_sided_media | If this bit is set to 1, then the disc subunit is able to play back two-sided media without user intervention. If this bit is set to 0, then the subunit does not support two sided media. If the media specification does not support two sides (such as CD), this bit shall be set to 0. |
| all others | | Reserved for future specification. |

FIG. 21

| Root Contents List Header | Audio Track | Video Track | Audio Track | Digital Still Image Track | Digital Still Image Track |
|---|---|---|---|---|---|

FIG. 22

| The General Object List Descriptor | |
|---|---|
| address | contents |
| 00 00$_{16}$ | descriptor_length |
| 00 01$_{16}$ | |
| 00 02$_{16}$ | list_type |
| 00 03$_{16}$ | attributes |
| 00 04$_{16}$ | size_of_list_specific_information |
| 00 05$_{16}$ | |
| 00 06$_{16}$ ⋮ ⋮ | list_specific_information |
| ⋮ ⋮ ⋮ | object_entry[0] |
| ⋮ ⋮ | ⋮ |
| ⋮ ⋮ ⋮ | object_entry[n-1] |

FIG. 23

| Disc Subunit Object Entry-type Definition |
|---|
| Audio Track |
| Isochronous Track |
| Asynchronous Track |

FIG. 24

| address offset | The General Object Entry Descriptor |
|---|---|
| | contents |
| $00\ 00_{16}$ | descriptor_length |
| $00\ 01_{16}$ | |
| $00\ 02_{16}$ | entry_type |
| $00\ 03_{16}$ | attributes |
| $00\ 04_{16}$ ⋮ | child_list_ID |
| ⋮ ⋮ ⋮ | object_ID |
| ⋮ ⋮ | size_of_entry_specific_information |
| ⋮ ⋮ ⋮ | entry_specific_information |

FIG. 25

| address offset | Disc Subunit Object Entry Specific Information |
|---|---|
| | contents |
| 00 00 | entry_specific_information_length |
| 00 01 | |
| 00 02 ⋮ ⋮ | disc_subunit_object_common_information |
| ⋮ ⋮ ⋮ | object_type_specific_information<br>(Isochronous track object_type_specific_information<br>Asynochronous track object_type_specific_information) |
| ⋮ ⋮ ⋮ | media_type_specific_information |

FIG. 28

| Payload Information Block ||
|---|---|
| address | contents |
| 00 00 | info_block_type |
| 00 01 | |
| 00 02 | info_block_length |
| 00 03 | |
| 00 04 | well_defined_fields_length |
| 00 05 | |
| 00 06 | well_defined_field(payload size) |
| 00 07 | |

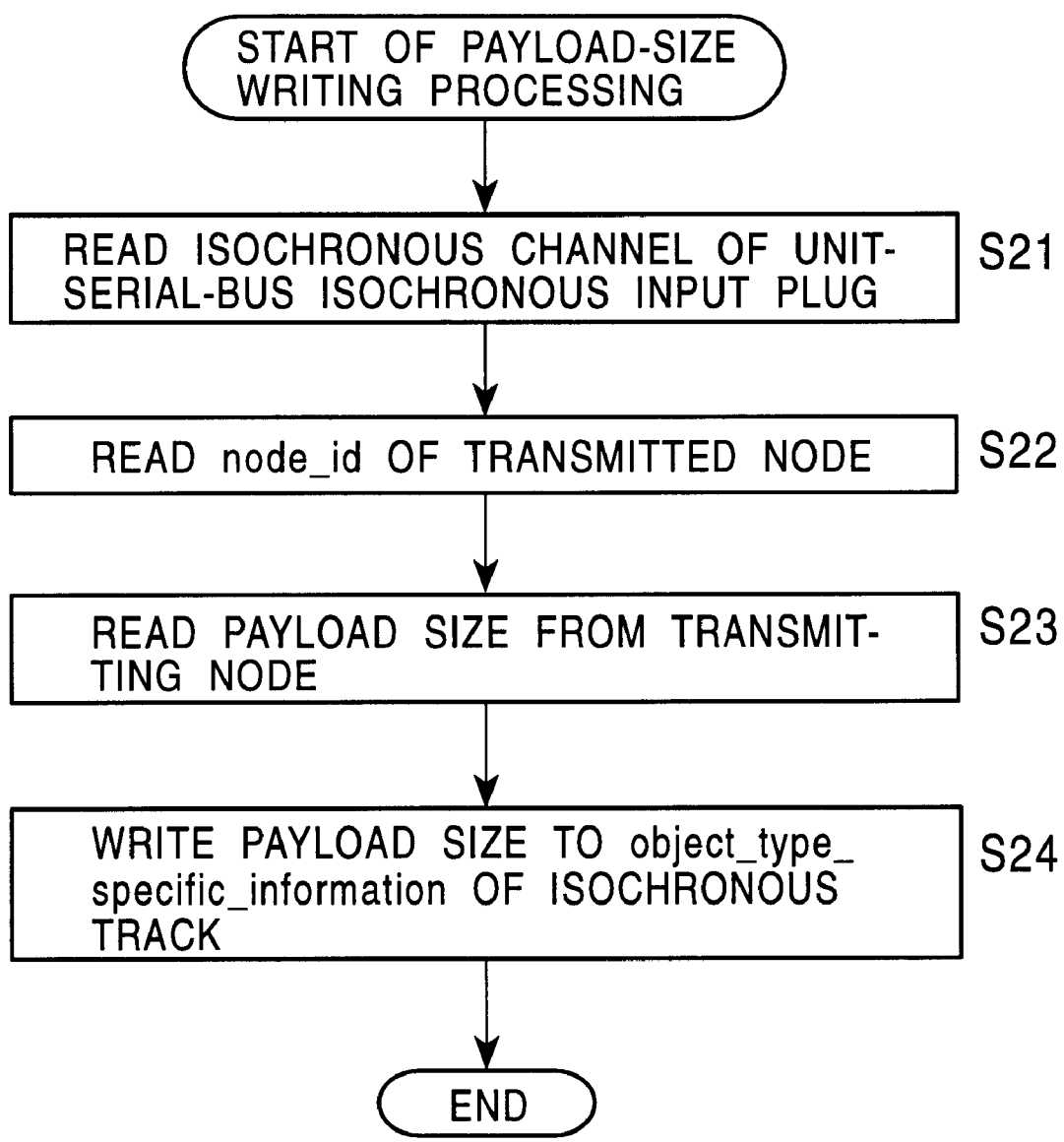

STREAM INFORMATION PROCESSING AND METHOD AND PROVIDING MEDIUM

BACKGROUND OF THE INVENTION

1. Field of the Invention

The present invention relates to information processing apparatuses and methods, and providing media, and more particularly, to an information processing apparatus and method, and a providing medium which allow stream data transmitted through an IEEE-1394 high-speed serial bus to be recorded as is.

2. Description of the Related Art

Recently, an IEEE (Institute of Electrical and Electronics Engineers) 1394 high-speed serial bus has attracted attentions. With the use of this IEEE-1394 bus, units can be connected, such as a compact disc player, a Mini Disc unit, a digital video cassette recorder, and a digital VHS (trademark), and information are transferred each other among them in a digital manner.

These units, however, handle data according to the signal formats corresponding to their standards. Therefore, if stream data is used as is, information cannot be transferred through the IEEE-1394 bus.

SUMMARY OF THE INVENTION

Accordingly, it is an object of the present invention to allow information to be transferred through a bus by the use of stream data.

The foregoing object is achieved in one aspect of the present invention through the provision of an information processing apparatus including: first identification means for identifying data to be transmitted or received as stream data; second identification means for identifying the size of the data identified by the first identification means; and management means for managing the first identification means and the second identification means.

The foregoing object is achieved in another aspect of the present invention through the provision of an information processing method including: a first identification step of identifying data to be transmitted or received as stream data; a second identification step of identifying the size of the data identified in the first identification step; and a management step of managing identification performed in the first identification step and the second identification step.

The foregoing object is achieved in still another aspect of the present invention through the provision of a providing medium for providing a program which can be read by a computer and which executes processing, the processing including: a first identification step of identifying data to be transmitted or received as stream data; a second identification step of identifying the size of the data identified in said first identification step; and a management step of managing identification performed in said first identification step and said second identification step.

In an information processing apparatus, an information processing method, and a providing medium according to the present invention, since data to be transmitted or received is identified as stream data and the size of the identified data is further identified, the stream data can be positively transferred through a bus, recorded, and reproduced.

BRIEF DESCRIPTION OF THE DRAWINGS

FIG. 5 is a view showing the positions, names, and functions of main CSRs.

FIG. 7 is a detailed view of a bus info block, a root directory, and a unit directory.

FIG. 8 is a view showing the structure of a PCR.

FIG. 9A to FIG. 9D show the structures of an oMPR, an oPCR, an iMPR, and an iPCR, respectively.

FIG. 14 is a view showing generation_ID shown in FIG. 13.

FIG. 15 is a view showing the format of disc_subunit_dependent_information shown in FIG. 13.

FIG. 16 is a view showing attributes shown in FIG. 15.

FIG. 17 is a view showing disc_subunit_version shown in FIG. 15.

FIG. 18 is a view showing supported_media_type_specification shown in FIG. 15.

FIG. 19 is a view showing supported_media_type shown in FIG. 18

FIG. 20 is a view showing media_type_attributes shown in FIG. 18.

FIG. 21 is a view showing the structure of a root contents list.

FIG. 22 is a view showing the structure of a general object list descriptor.

FIG. 23 is a view showing an example of a disc subunit object entry_type definition.

FIG. 24 is a view showing the structure of a general object entry descriptor.

FIG. 25 is a view showing the structure of disc subunit object entry specific information.

FIG. 28 is a view showing the structure of a payload information block.

FIG. 30 is a flowchart of payload-size writing processing in an HDD 3 shown in FIG. 1.

DESCRIPTION OF THE PREFERRED EMBODIMENT

An embodiment of the present invention will be described below. To clarify the relationship between each means of the present invention specified in claims and the following embodiment, the features of the present invention will be described below by noting the embodiment (one example only) corresponding to each means in parentheses after the means. This description does not mean that each means is limited to the example described.

An information processing apparatus according to the present invention includes first identification means (an isochronous track in FIG. 23, for example) for identifying data to be transmitted or received as stream data; second identification means (a payload size in FIG. 26, for example) for identifying the size of the data identified by the first identification means; and management means (a disc subunit 31 in FIG. 3, for example) for managing the first identification means and the second identification means.

An information processing apparatus according to the present invention may further include reading means (a step S21 in FIG. 30, for example) for reading the first identification means from the another information processing apparatus when the stream data is received from the another information processing apparatus through the bus and recorded.

An information processing apparatus according to the present invention may further include obtaining means (a step S5 in FIG. 29, for example) for reading the second identification means and for obtaining a necessary resource when the stream data is transmitted through the bus.

Figure 1:
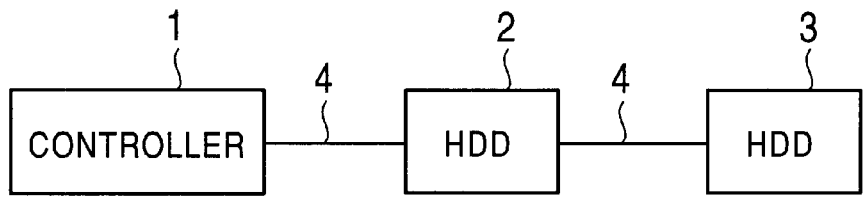
FIG. 1 is a block diagram showing an example structure of an information processing system to which the present invention is applied.

FIG. 1 shows an example structure of an information processing system to which an information processing apparatus according to the present invention is applied. In this system, a controller 1 and hard-disk drives (HDDs) 2 and 3 for recording and reproducing audio data and video data are connected to each other through an IEEE-1394high-speed serial bus 4.

Figure 2:
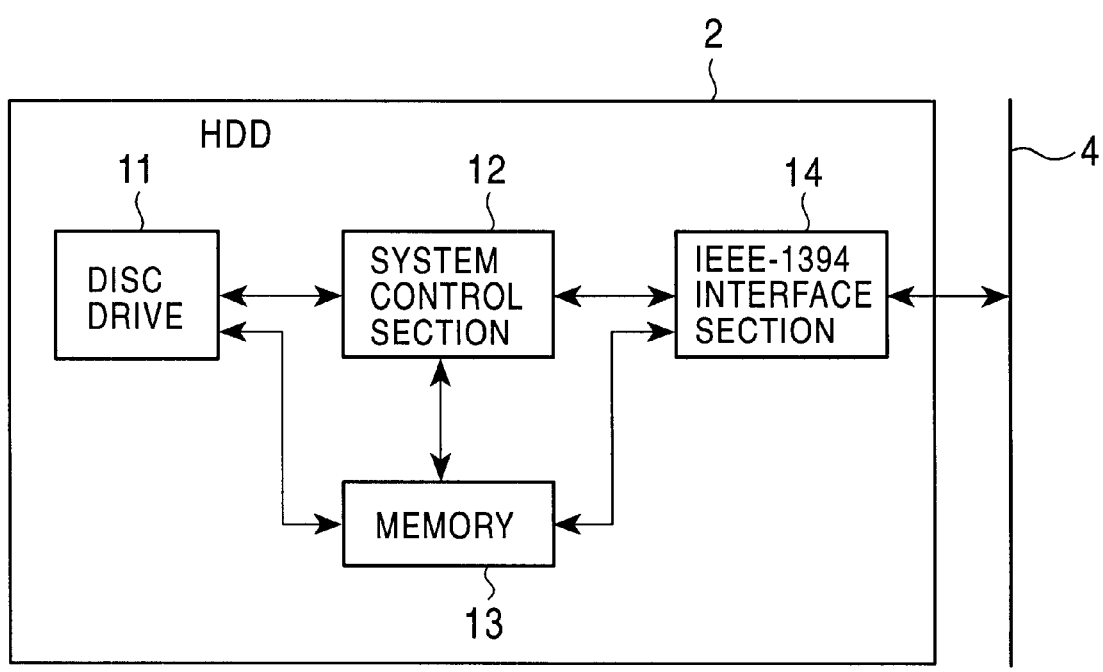
FIG. 2 is a block diagram showing an example structure of an HDD 2 shown in FIG. 1.

FIG. 2 shows an example structure of the HDD 2. As shown in FIG. 2, a system control section 12 controls a disk drive 11 as to record information into or reproduce information from a built-in hard disk. A memory 13 stores a descriptor required for transferring information through the IEEE-1394 bus 4. An IEEE-1394 interface section 14 executes interface processing between the IEEE-1394 bus 4 and the system control section 12.

Figure 3:
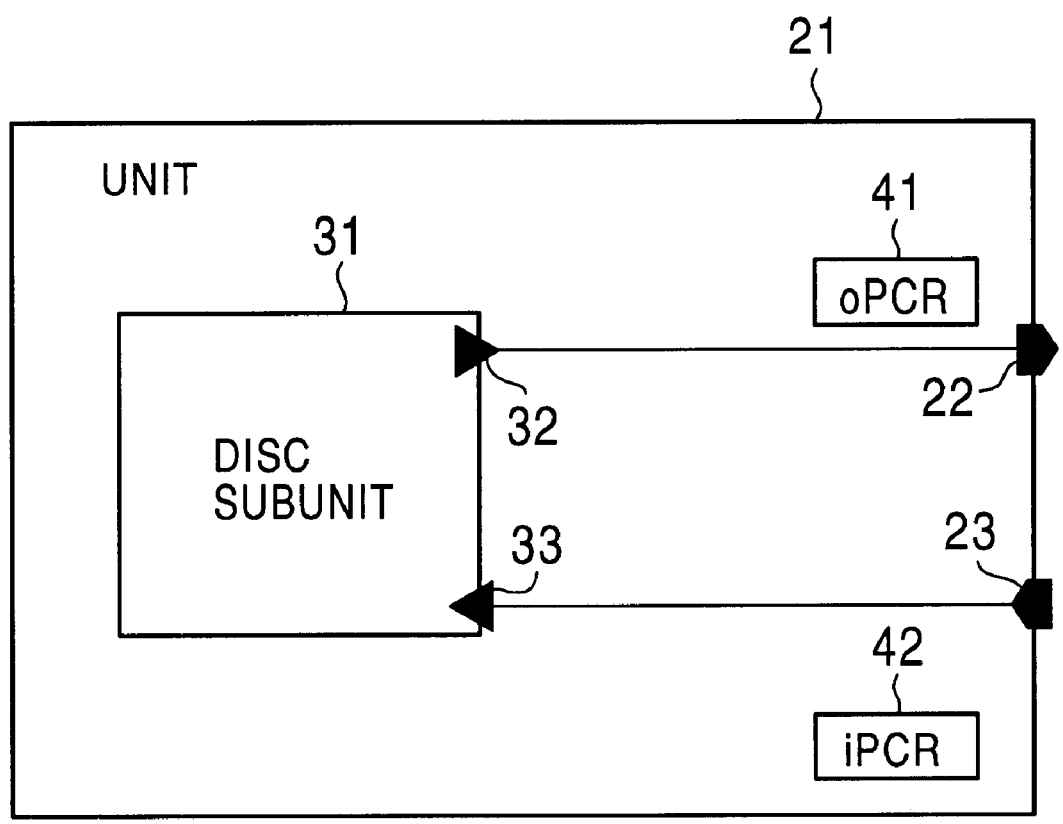
FIG. 3 is a view showing a logical model in a system control section 12 of the HDD 2, shown in FIG. 2.

The system control section 12 virtually generates a logical model shown in FIG. 3 so as to transfer information mutually to and from other units through the IEEE-1394 bus 4. A unit 21 corresponds to the whole of the HDD 2, and has a unit-serial-bus isochronous output plug 22 and a unit-serial-bus isochronous input plug 23. This unit-serial-bus isochronous output plug (hereinafter called just an output plug) 22 serves as a virtual output terminal used when information is transmitted from the unit 21 through the IEEE-1394 bus 4 with the use of an isochronous packet. The unit-serial-bus isochronous input plug (hereinafter called just an input plug) 23 serves as a virtual input terminal through which an isochronous packet transmitted through the IEEE-1394 bus 4 is input.

Figure 4:
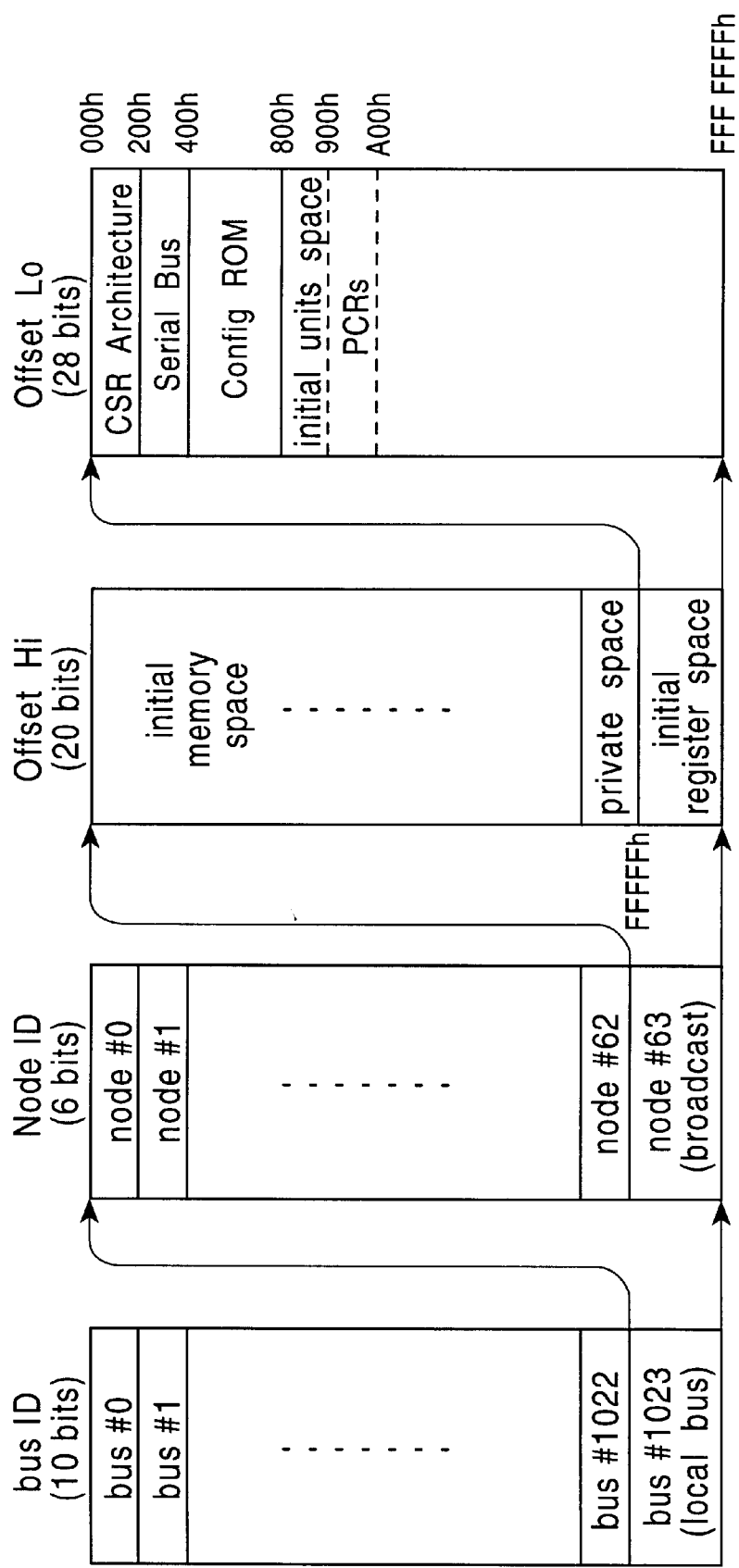
FIG. 4 is a view showing the structure of an address space in a CSR architecture.

The input plug and the output plug will be described below by referring to FIG. 4 to FIG. 10. FIG. 4 shows the structure of an address space in a CSR architecture. The upper 16 bits indicate the node IDs of nodes on the IEEE-1394 bus, and the remaining 48 bits are used to specify an address space assigned to each node. The upper 10 bits are further divided into 10 bits indicating bus IDs and six bits indicating physical IDs (node IDs in a narrow sense). Since the value formed of all "1" bits is used for a special purpose, 1023 buses and 63 nodes can be specified.

In an address space of 256 tera bytes specified by the lower 48 bits, the space specified by the upper 20 bits is divided into an initial register space used for a 2048-byte CSR register and an IEEE-1394 register, a private space, an initial memory space, and others. The space specified by the lower 28 bits is used for a configuration read-only memory (ROM), an initial unit space used specially for nodes, and plug control registers (PCRs) for the input plug and the output plug, when the space specified by the upper 20 bits is the initial register space.

FIG. 5 shows the offset addresses, the names, and the functions of main CSRs. The offset addresses shown in FIG. 5 indicate offsets from FFFFF0000000h (a figure with "h" being added last indicates a hexadecimal notation), where the initial register space starts. A bandwidth available register, having an offset address of 220h, shows a bandwidth which can be assigned to isochronous communication, and the value of a node which operates as an isochronous resource manager is only effective. In other words, each node has the CSR shown in FIG. 4, but only nodes serving as the isochronous resource managers are effective for the bandwidth available resister. Namely, only the isochronous resource managers substantially have the bandwidth available registers. The bandwidth available register stores the maximum value when the bandwidth is not assigned to isochronous communication. The value is reduced as a bandwidth is assigned.

In a channel available register with an offset addresses of 224h to 228h, each bit corresponds to each of the channel numbers ranging from 0 to 63. When a bit value is 0, the corresponding channel has been assigned. Only the channel available registers of nodes serving as isochronous resource managers are effective.

Figure 6:
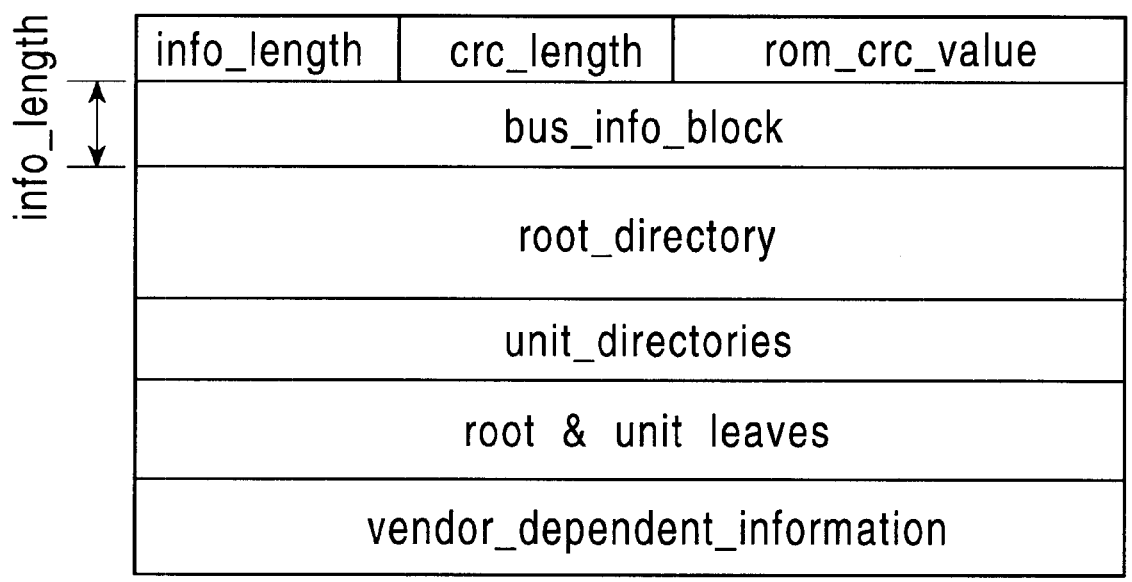
FIG. 6 is a view showing a general ROM format.

Back to FIG. 4, the configuration ROM conforming to a general ROM format is disposed at addresses from 200h to 400h in the initial register space. FIG. 6 shows the general ROM format. A node, which is an access unit on the IEEE-1394 bus, can include a plurality of units using an address space in common and operating independently. Unit directories can indicates a software version and a location for a unit. The positions of bus_info_block and root_directory are fixed, but those of the other blocks are specified by offset addresses.

FIG. 7 shows in detail bus info block, root_directory, and unit_directory. In bus_info_block, Company_ID stores the ID number of an apparatus manufacturer, and Chip_ID stores an ID unique to the apparatus in the world, which is not identical to the other IDs. In unit_spec_id of unit_directory for an apparatus conforming to IEC 61883, 00h is written into the first octet, A0h is written into the second octet, and 2Dh is written into the third octet according to the IEC-61883 standard. In unit_sw_version, 01h is written into the first octet and 1 is written into the least significant bit (LSB) of the third octet.

To control the input and output of an apparatus through an interface, a node has a plug control register (PCR) specified in the IEC-61883 standard at addresses 900h to 9FFh in the initial unit space shown in FIG. 4. The PCR has been made from the concept of the input plug and the output plug in order to form a signal path logically similar to an analog interface. FIG. 8 shows a PCR structure. The PCR includes output plug control registers (oPCRs) indicating output plugs and input plug control registers (iPCRs) indicating input plugs. The PCR also includes an output master plug register (oMPR) and an input master plug register (iMPR) showing the information of an output plug and an input plug unique to each apparatus. Each apparatus has only one oMPR and only one iMPR, but can have a plurality of oPCRs and iPCRs corresponding to plugs according to the capacity of the apparatus. The PCR shown in FIG. 8 includes 31 oPCRs and 31 iPCRs. The flow of isochronous data is controlled by manipulating the registers corresponding to the plugs.

FIGS. 9A to 9D show the structures of an oMPR, an oPCR, an iMPR, and an iPCR, respectively. In the two MSB bits of each of the oMPR and iMPR, a data rate capability stores a code indicating the maximum transfer rate of isochronous data to be transmitted or received by the apparatus. A broadcast channel base of the oMPR specifies the number of a channel to be used for a broadcast output.

In the five LSB bits of the oMPR, the number of output plugs stores the number of output plugs which the apparatus has, that is, the number of oPCRs. In the five LSB bits of the iMPR, the number of input plugs stores the number of input plugs which the apparatus has, that is, the number of iPCRs. Non-persistent extension fields and persistent extension fields are areas defined for future expansion.

In the MSB of each of the oPCR and the iPCR, "on-line" indicates the condition of use of the corresponding plug. In other words, when the value is 1, the plug is on-line, and when the value is 0, the plug is off-line. A broadcast connection counter in each of the oPCR and the iPCR indicates whether a broadcast connection is provided (1) or not (0). A six-bit point-to-point connection counter in each of the oPCR and the iPCR indicates the number of point-to-point connections which the corresponding plug has.

A six-bit channel number in each of the oPCR and the iPCR indicates the number of an isochronous channel to which the corresponding plug is connected. A two-bit data rate in the oPCR indicates the actual transfer rate of the packet of isochronous data output from the plug. A four-bit overhead ID indicates a bandwidth overhead in isochronous communication. A 10-bit payload in the oPCR indicates the maximum value of data included in an isochronous packet, which the plug can handle.

Figure 10:
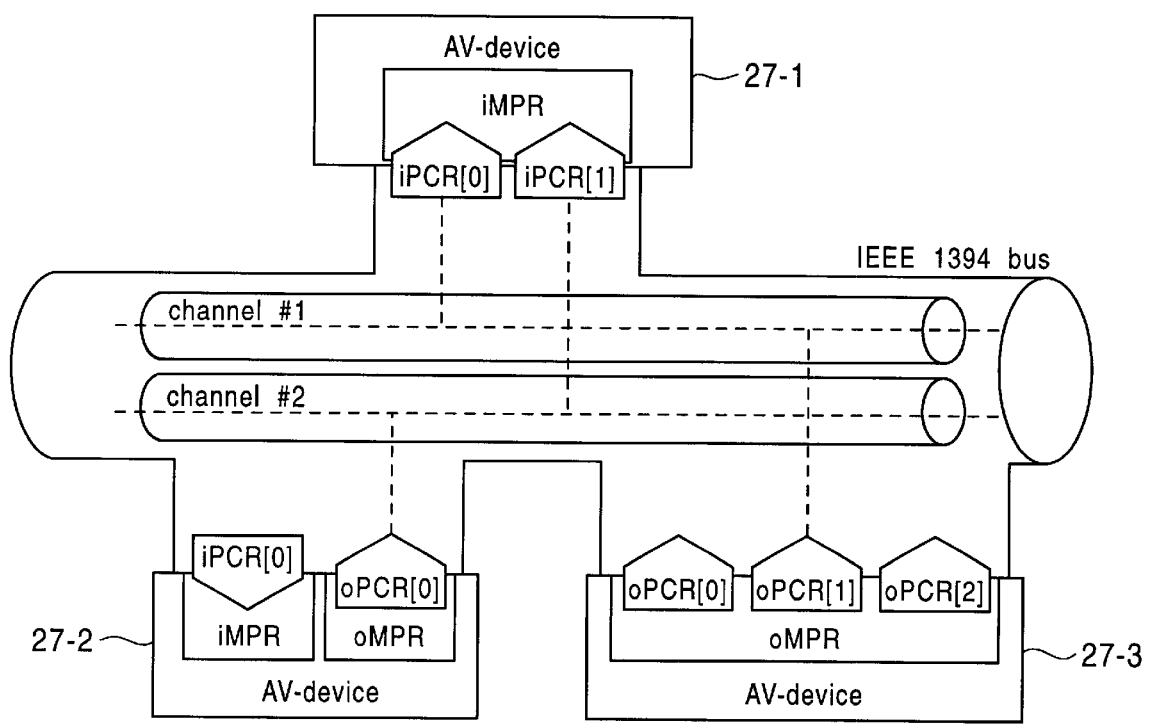
FIG. 10 is a view showing relationships among plugs, plug control registers, and isochronous channels.

FIG. 10 shows relationships among plugs, plug control registers, and isochronous channels. AV devices 27-1 to 27-3 are connected through an IEEE-1394 serial bus. The AV device 27-3 transmits isochronous data for which a channel is specified by its oPCR[1] among its oPCR[0] to its oPCR[2] for which a transfer rate and the number of oPCRs are specified by the oMPR of the AV device 27-3, to a channel #1 of the IEEE-1394 serial bus. The AV device 27-1 reads the isochronous data transmitted to the channel #1 of the IEEE-1394 serial bus, by its iPCR[0] for which the input channel #1 is specified among its iPCR[0] and its iPCR[1] for which a transfer rate and the number of iPCRs are specified by the iMPR of the AV device 27-1. In the same way, the AV device 27-2 transmits isochronous data to a channel #2 specified by its oPCR[0], and the AV device 27-1 reads the isochronous data from the channel #2 specified by its iPCR[1].

Back to FIG. 3, the unit 21 includes a disc subunit 31 corresponding to the recording and reproduction function of the disc drive 11. This disc subunit 31 is provided with a subunit source plug 32 and a subunit destination plug 33. The subunit source plug (hereinafter called just a source plug) 32 serves as a virtual output terminal used for outputting information from the disc subunit 31, and the subunit destination plug (hereinafter called a destination plug) 33 serves as a virtual input terminal through which information is input to the disc subunit 31.

The unit 21 also has an output-plug control register (oPCR) 41 and an input-plug control register (iPCR) 42. The oPCR 41 stores the channel number of an isochronous channel connected to the output plug 22 and a source plug (in the example shown in FIG. 3, the source plug 32) connected to the output plug 22. In the same way, the iPCR 42 stores the channel number of an isochronous channel connected to the input plug 23 and a destination plug (in the example shown in FIG. 3, the destination plug 33) connected to the input plug 23.

Although not shown, the HDD 3 also has the same structure as that shown in FIG. 2 essentially. Its system control section generates the same logical model as that shown in FIG. 3.

Figure 11:
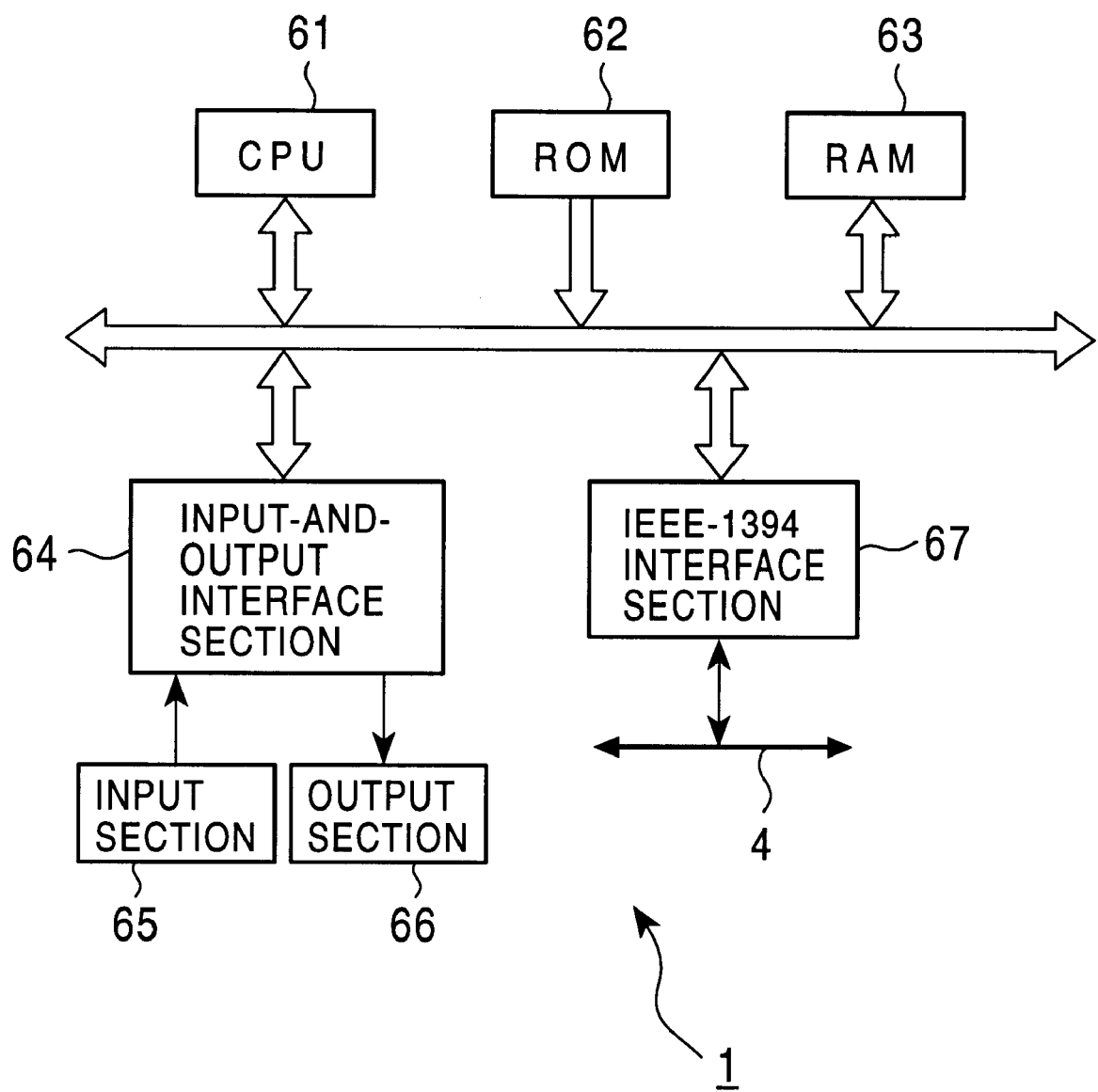
FIG. 11 is a block diagram showing an example structure of a controller 1 shown in FIG. 1.

FIG. 11 shows an example structure of the controller 1. A CPU 61 executes various types of processing according to a program stored in a ROM 62. A RAM 63 stores, as required, a program and data necessary for the CPU 61 to execute the various types of processing. An input-and-output interface section 64 is connected to an input section 65 formed of a keyboard, a mouse, and other items, and to an output section 66 formed of a CRT, a speaker, and other items. The input-and-output interface section 64 executes interface processing between the CPU 61 and the input section 65, and between the CPU 61 and the output section 66. An IEEE-1394 interface section 67 executes interface processing between the IEEE-1394 bus 4 and the CPU 61.

Also in the controller 1, the CPU 61 generates the logical model of a unit and subunits corresponding to functions, in its inside in the same way as shown in FIG. 3, although the model is not shown.

An AV/C disc model is basically formed of a control command group, including a play command and a stop command, and a descriptor group indicating the contents and the operation state of a disc. Their details are disclosed, for example, in "AV/C Disc Subunit Model and Command Set," version 0.963, Jul. 15, 1988, 1394 Trade Association.

The AV/C disc model specifies an AV/C disc subunit, and has descriptors, such as a subunit identifier descriptor, a subunit status descriptor, a contents list descriptor, and a play list descriptor. The structure and the access method conforming to an AV/C general descriptor model are applied to these descriptors.

Figure 12:
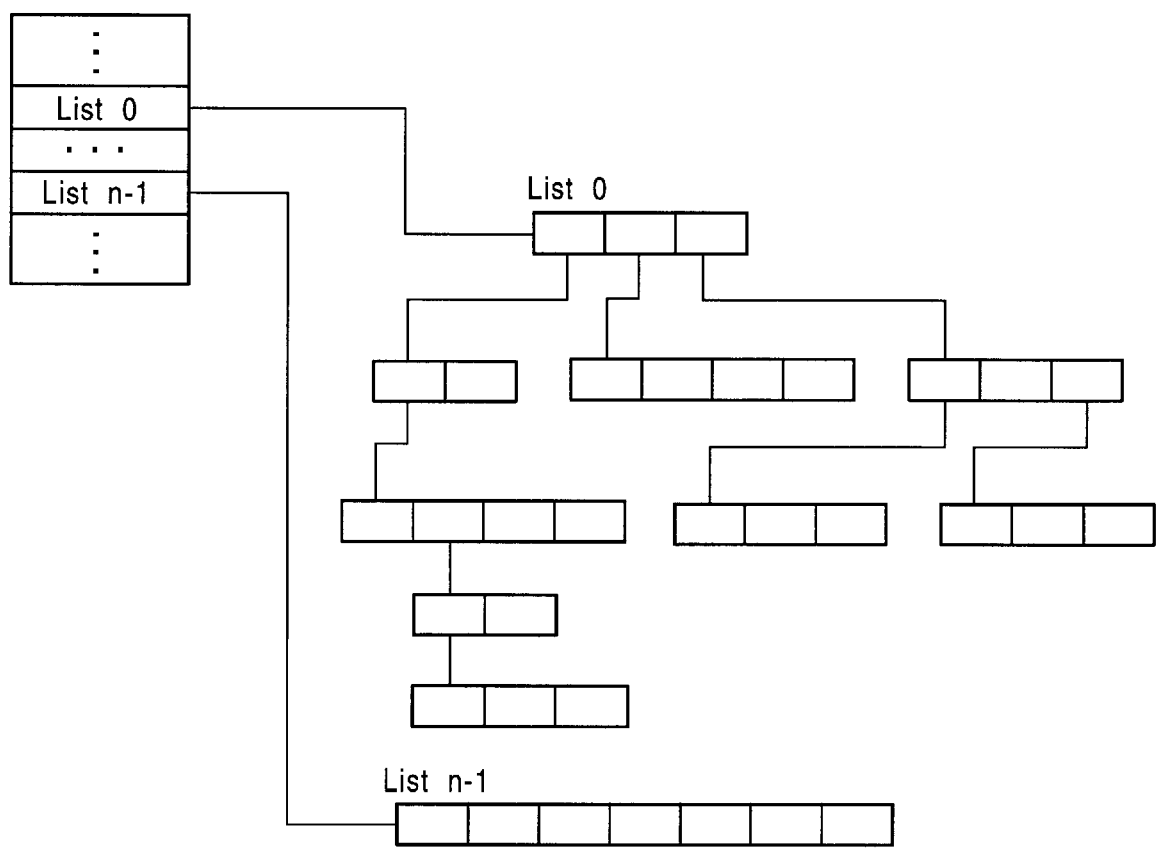
FIG. 12 is a view showing the data structure of a subunit identifier descriptor.

The data structure of the subunit identifier descriptor in the AV/C command set will be described below by referring to FIG. 12 to FIG. 15. FIG. 12 shows the data structure of the subunit identifier descriptor. As shown in FIG. 12, the subunit identifier descriptor is formed of a list having a hierarchical structure. A list refers to, for example, a channel to be received for a tuner or a recorded musical piece for a disc. A list at the most upper layer in a hierarchical structure is called a root list. For example, a list 0 is a root for its lower lists. Lists 2 to (n−1) also serve as root lists. The number of root lists equals that of objects. An object refers to, for example, each channel in digital broadcasting when an AV unit serves as a tuner. All lists in one layer share common information.

Figure 13:
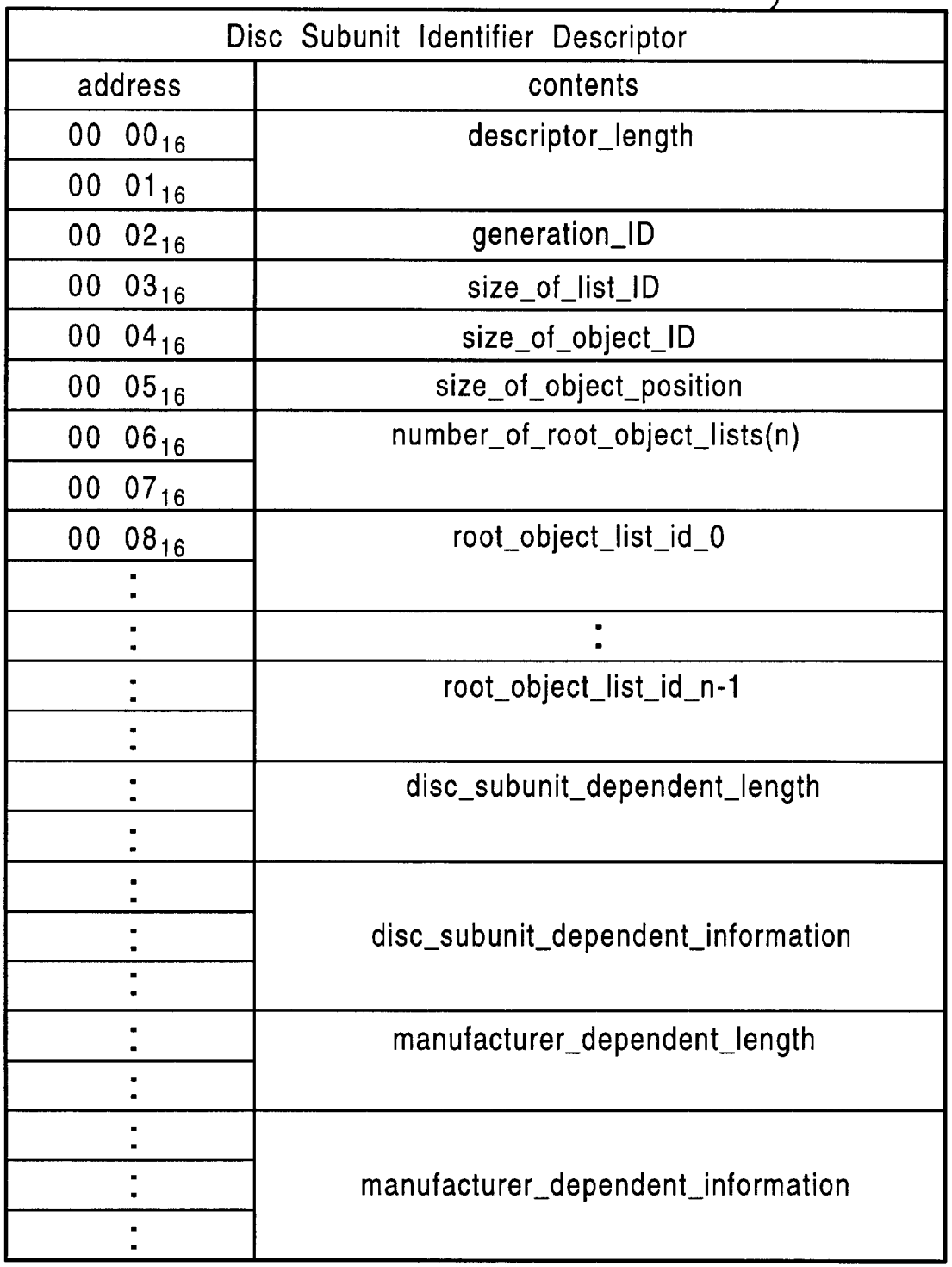
FIG. 13 is a view showing the format of a disc subunit identifier descriptor.

FIG. 13 shows the format of a disc subunit identifier descriptor. The disc subunit identifier descriptor 41 describes attribute information related to a function in its contents. A descriptor_length field indicates the length (the number of bytes) of the descriptor structure, and the value of this field does not include the length of the descriptor_length field itself. A generation_ID field indicates the version of the AV/C command set, and is currently set to 00h as shown in FIG. 14. This value means that the data structure and commands conform to the version 3.0 of the AV/C general specification. As shown in FIG. 14, all values other than 00h are reserved for future specifications.

A size_of_list_ID field indicates the number of bytes in a list ID. A size_of_object_ID field specifies the number of bytes in an object ID. A size_of_object_position field indicates the position (the number of bytes) of an object in a list when the object is referred to during control. A number_of_root_object_lists field shows the number of root object lists. A root_object_list_id field indicates an ID for identifying the most upper root object list in each independent layer.

A disc_subunit_dependent_length field shows the number of bytes in the subsequent disc_subunit_dependent_information field. The disc_subunit_dependent_information field indicates information unique to a function. A manufacturer_dependent_length field shows the number of bytes in the subsequent manufacturer_dependent_information field. The manufacturer_dependent_information field indicates the information of the specification of a vendor (manufacturer). When the information is not specified in the descriptor, this field is not included.

FIG. 15 shows the format of the disc_subunit_dependent_information field shown in FIG. 13. Disc_subunit_dependent_info_fields_length indicates the number of bytes in the disc_subunit_dependent_information field excluding an info block. In this case, it indicates the number of bytes from supported_media_type_specification[0] to supported_media_type_specification[n−1]. The controller easily determines whether the info block exists by comparing the disc_subunit_dependent_length field and the disc_subunit_dependent_info_fields_length.

As shown in FIG. 16, the first bit of attributes indicates that the next byte is also an attributes byte. The last bit is related to copyright.

Disc_subunit_version specifies the version number of a disc subunit command specification, and is set as shown in FIG. 17.

Number_of_supported_media_types includes the number of the types of different discs which this subunit supports.

In supported_media_type_specification, supported disc specifications are arranged in a matrix. Each specification includes an entry common to all specifications and an entry unique to the type of the specification. All media type specifications have a format shown in FIG. 18.

In FIG. 18, supported_media_type shows the type of a supported medium, as shown in FIG. 19. The upper part indicates the family of the medium and the lower part indicates a more detailed specification or its format. For an MD-audio, for example, 0301h is set.

In FIG. 18, implementation_profile_ID specifies a profile ID for implementation of a disc having the supported medium type. A disc subunit can be implemented with a different profile for each of the supported medium types. One profile is specified for each supported medium type. The profiles are defined in disc-subunit-medium-type-specific documents.

As shown in FIG. 20, the first bit of media_type_attributes indicates whether the next byte is also an attributes byte. The last bit shows whether recording can be performed for a predetermined medium. When the bit is cleared, the medium is used for read-only. The second bit from the last indicates whether a hierarchical storage model is supported. The third bit from the last shows whether a double-sided medium can be reproduced without user intervention. When this bit is set to 0, the subunit does not support a double-sided medium.

A descriptor indicates a description method (form). For example, the contents list descriptor indicates the description method of a contents list. Unless both needs to be accurately discriminated, both may be regarded as the same.

The subunit identifier descriptor has information related to the capacity of the disc subunit, as described above. Its data is managed by the disc subunit and is read-only from the outside. The subunit status descriptor indicates the current condition of the disc subunit and is read-only from the outside.

The contents list descriptor indicates the information of the contents recorded in a disc, and is read-only from the outside. For an audio disc, information of each song (track), such as the name of the song, an artist name, the title, and the period of time, is described there. When a track is added or edited, since the contents data of the track which the contents list indicates is rewritten, the contents of the contents list is updated accordingly.

The play list descriptor describes a list of a reproduction order or conditions. When the disc has a fixed reproduction order, this descriptor is read-only. When the user specifies a reproduction order, the descriptor can be written. The contents data is not developed on a descriptor.

A descriptor is accessed (read and written) by a read/write descriptor command. Contents data is changed by an access command specially used for contents data. For an audio disc, a record command is used to change actual audio data. An editing point is specified as a configuration of a record command. A cluster of asynchronous data such as a jacket picture (still picture) is recorded as one object by a record object command.

In an AV-HDD model, which is a part of the AV/C disc model, an object descriptor is recorded on an HDD with a physical address in a format of a file in the same way as for contents data. One file may be recorded in discrete vacant areas on the disc. In the AV/C AV-HDD model, a physical file structure (location) is managed in the HDD and not shown to the outside. As a result, an external controller controls the HDD without paying attention to the internal structure of the HDD. This HDD differs from an HDD serving as a peripheral of a computer in this point.

The AV-HDD model is divided into two groups. One serves as a general-purpose-storage model. In this AV-HDD, the contents of recorded data are not managed. The other is provided with a built-in decoder corresponding to the type of data to be recorded and a data processor, and can manipulate the data. The latter model performs information management depending on a data format in the same way as in an audio disc model. Since the HDDs 2 and 3 shown in FIG. 1 record and reproduce stream data as is, the former AV-HDD model, serving as a general-purpose storage medium is applied to them.

The contents list includes a root contents list and a child contents list. In these two, for example, the root contents list is structured as shown in FIG. 21.

The contents list is described, for example, by a general object list descriptor shown in FIG. 22.

Object descriptors in the contents list describe information related to objects. The AV-HDD itself does not manage the format of recorded data. Therefore, in the present embodiment, as entry_type of an object descriptor, an isochronous track and an asynchronous track are defined in addition to an audio track as shown in FIG. 23. When a stream received in isochronous transfer is recorded, entry_type is set to an isochronous track. When data received in asynchronous transfer is recorded, entry_type is set to an asynchronous track.

A general object entry descriptor shown in FIG. 24 describes object_entry shown in FIG. 22. This object entry descriptor includes an entry_specific_information field, and the structure of the field is determined by list_type and entry_type of the object list to which it belongs. A general form of an entry_specific_information field in the disc subunit contents list is shown in FIG. 25.

Disc subunit_object_common_information stores information common to AV/C disc subunits, and includes information such as the time when an object (contents data) was created, the update time, the size, the name, and the icon. The structure of object_type_specific_information is determined for each entry_type. When the AV-HDD is used in the same way as for an audio disc such as an MD, entry_type is set to an audio track and information related to audio is held there in the structure already determined for an audio disc. On the other hand, when the AV-HDD is used as a general-purpose data storage, entry_type is set to an isochronous track or an asynchronous track and information for a general-purpose data storage is stored, as described above. In this case, object_type_specific_information is changed to isochronous track object_type_specific_information or asynchronous track_object_type_specific_information.

media_type_specific_information stores information depending on the type of a disc medium and is specified for an AV-HDD.

When an AV-HDD, a DVD stream recorder, and others are used as general-purpose data storage units, an isochronous signal input through the IEEE-1394 bus 4 is recorded as is in the transfer packet format. Since an isochronous packet is transferred at an interval of 125 *us, the signal is recorded on a disc with the delimitation of each packet added. In reproduction, when reproduced data is output at an interval of 125 *us in packet units, the input signal is output as is.

Figure 26:
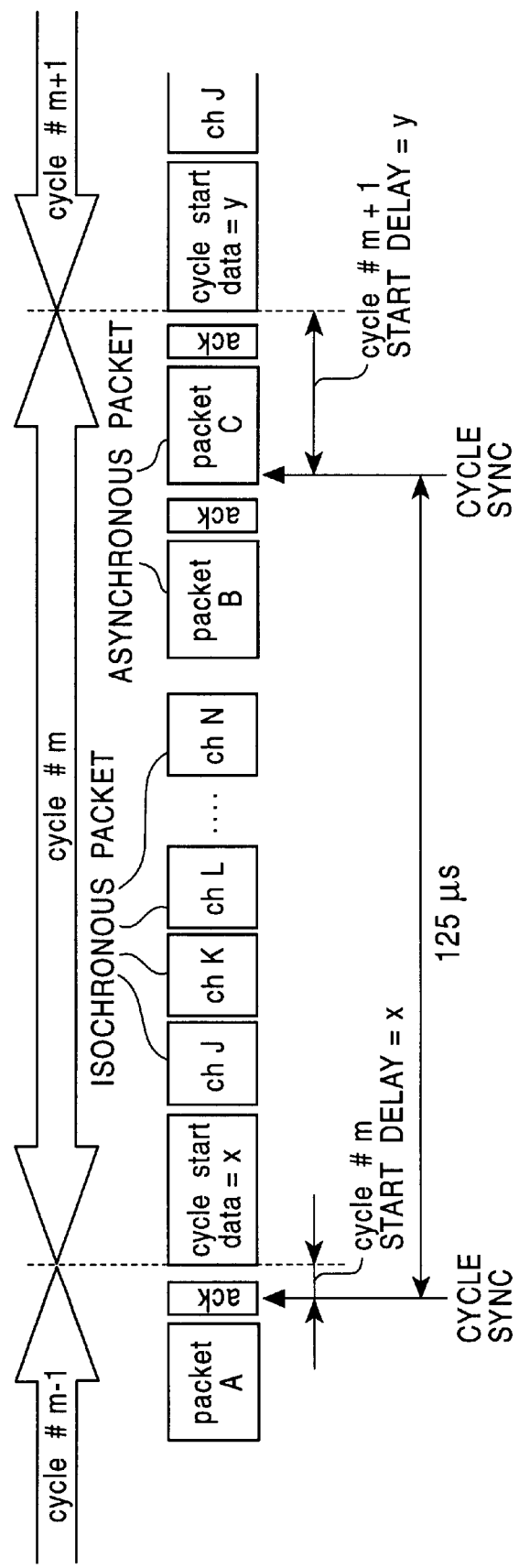
FIG. 26 is a view showing a cyclic structure in data transfer between units connected with an IEEE-1394 interface.

FIG. 26 shows a cyclic structure of data transfer between units connected through an IEEE-1394 interface. In the IEEE-1394 interface, data is divided into packets and transferred in a time-division manner at an interval of 125 $\mu s$. This interval is generated by a cycle start signal sent from a unit having a cycle master function. Isochronous packets obtain in advance a bandwidth necessary for transfer from the top of all cycles. Therefore, transfer of data in a certain time period is assured in isochronous transfer. If an transfer error occurs, since error protection is not provided, data is lost.

During a period while isochronous transfer is not being performed, a node which has obtained the bus after arbitration sends asynchronous packets. In asynchronous transfer, positive transfer is assured with the use of acknowledgements and retries, but transfer timing is not constant.

Figure 27:
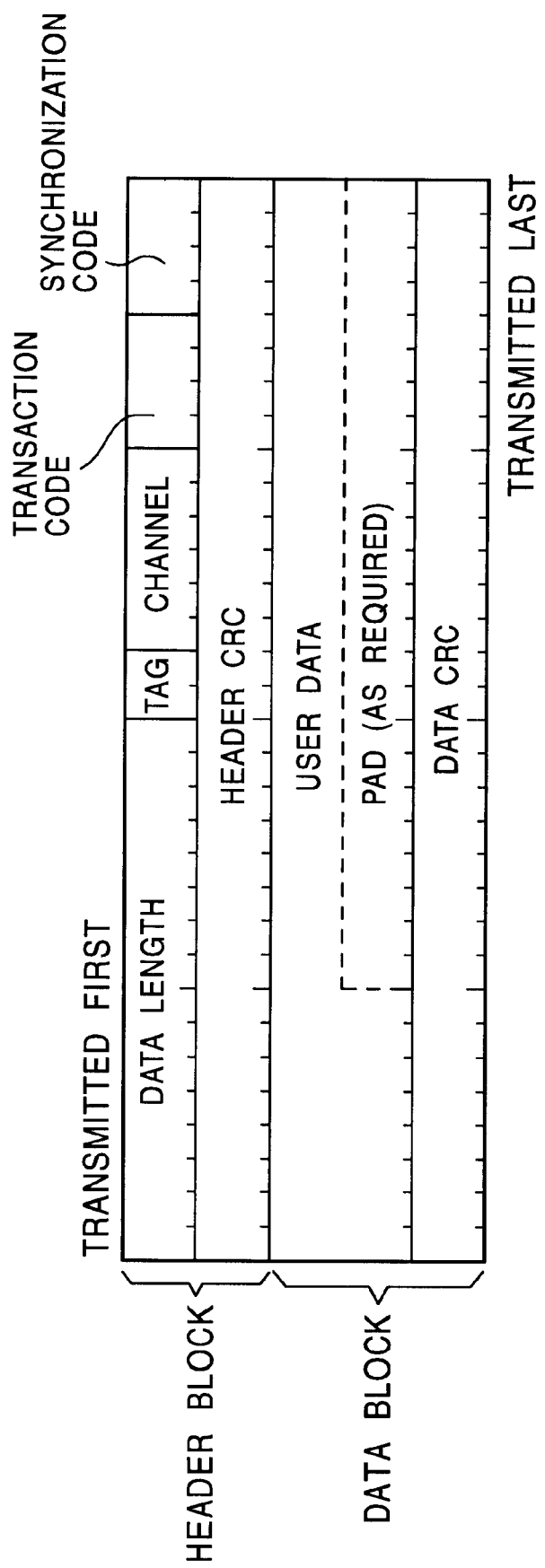
FIG. 27 is a view showing the data format of an isochronous packet.

FIG. 27 shows the data format of an isochronous packet. In this isochronous packet, a header is formed of a data length, the format tag of the isochronous data, an isochronous channel, described later, a transaction code, a synchronization code, and a header CRC, which is the CRC of the header; and a data block is formed of user data and a data CRC, which is the CRC of the data.

To output a signal to the IEEE-1394 bus 4, it is necessary to obtain a bus resource (channel and bandwidth) in advance. For this processing, an isochronous resource manager (IRM) obtains an isochronous channel and a bandwidth required for transmission.

The type and bandwidth of a signal recorded on a general-purpose storage are, however, not fixed. A signal-connection method between an output unit and an input unit is specified in IEC 61883 as a connection management procedure, as described above. A controller, which is a third unit other than the output unit and the input unit, can manage a signal connection between the output unit and the input unit. In the structure shown in FIG. 1, for example, the controller 1 can transfer data recorded in the HDD 2 to the HDD 3 through the IEEE-1394 bus 4. In this case, however, since the HDD 2 and the HDD 3 are general-purpose storage units, the controller 1 cannot determine what bandwidth needs to be obtained for signal transfer.

Therefore, in the present invention, a payload size is described in a payload information block in the isochronous track object_type_specific$_{13}$ information field as shown in FIG. 28. In FIG. 28, the payload size is noted at addresses 0006 to 0007. Payload-size data is expressed in 10 bits. Since the field has two bytes, the upper six bits are always set to zero. A one-bit value expresses quadlet (four-byte) data.

Figure 29:
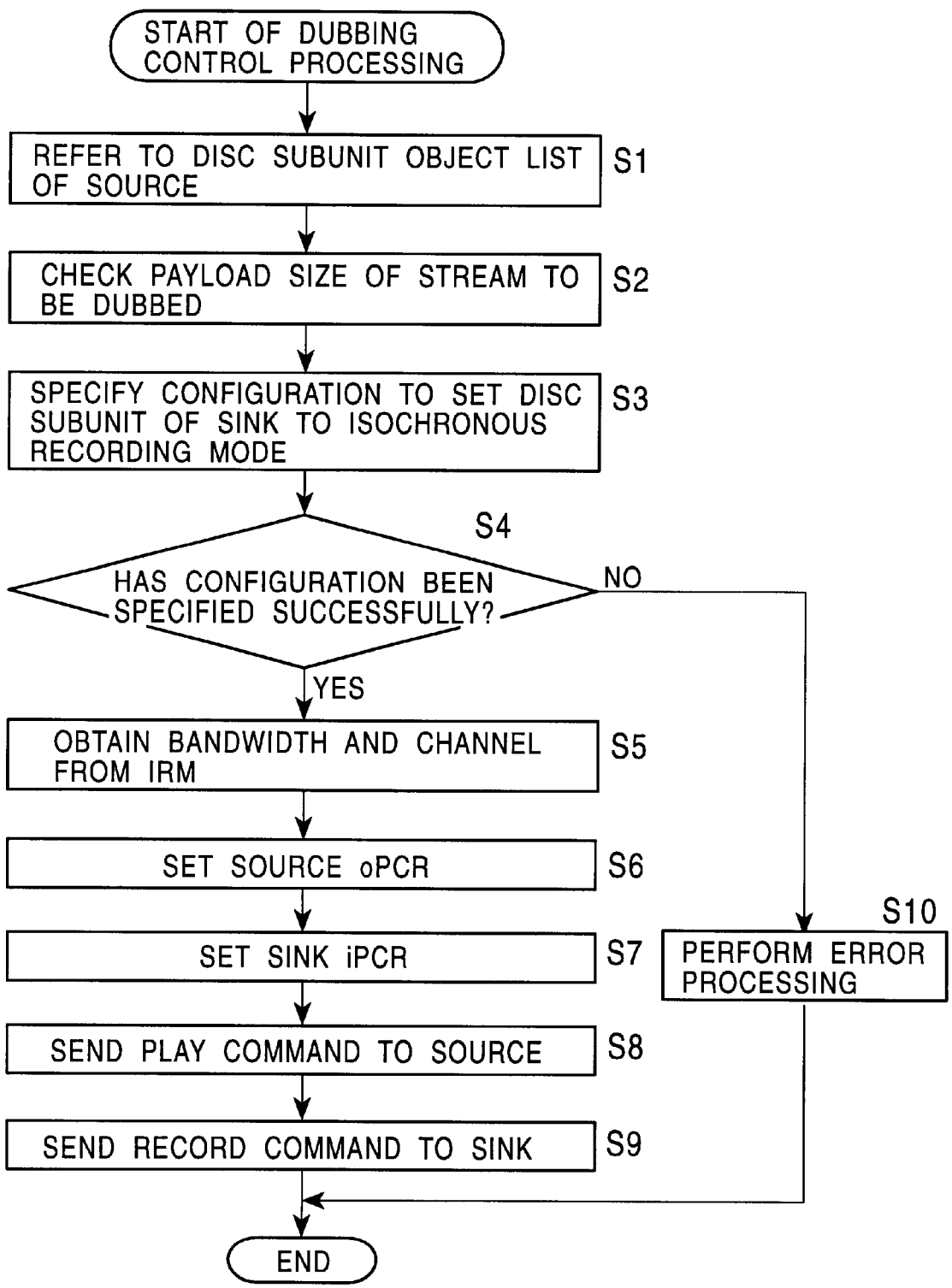
FIG. 29 is a flowchart of dubbing processing in the system shown in FIG. 1.

Processing to be executed when the controller 1, shown in FIG. 1, reproduces stream data stored in the HDD 2, transmits it to the HDD 3 through the IEEE-1394 bus 4, and records it in the HDD 3 will be described below by referring to a flowchart shown in FIG. 29.

In a step S1, the controller 1 refers to the disc subunit object list of the HDD 2, which serves as a source. From this disc subunit object list, the controller 1 confirms that entry_type of HDD 2 is an isochronous track. If entry_type is not an isochronous track, since it is not possible to reproduce stream data as is, to transmit it through the IEEE-1394 bus 4, and to record it into the HDD 3, the processing is terminated. When entry_type is an isochronous track, the controller 1 reads the value of the payload size of the stream to be dubbed, stored in the oPCR 41 of the HDD 2, in a step S2.

The processing proceeds to a step S3. The controller 1 executes a process for specifying a configuration to set the disc subunit of the HDD 3, which serves as a sink, to an isochronous recording mode.

Then, the processing proceeds to a step S4. The controller 1 determines whether the configuration has been set successfully. If the configuration is set unsuccessfully because, for example, the HDD 3 is a unit which stores only MPEG data or for some reason, the processing proceeds to a step S10 and error processing is performed. When the configuration is successfully set, the processing proceeds to a step S5. The controller 1 executes a process for obtaining resources from the isochronous resource manager (IRM). Specifically, an isochronous channel and a bandwidth are obtained. The controller 1 calculates a required bandwidth on the IEEE-1394 bus from the data rate, the payload, and overhead_id in the oPCR of the HDD 2, which serves as the source. If the payload is not specified, since the bandwidth cannot be calculated due to an unclear data amount, a resource cannot be obtained. In the present invention, since the amount of data is positively described in the payload, a resource can be obtained.

The processing proceeds to a step S6. The controller 1 specifies a connection between a source plug and an output plug, an assignment of an isochronous channel to the output plug, and other factors in the oPCR 41 of the HDD 2, the source. In a step S7, the controller 1 specifies predetermined items in the iPCR of the HDD 3, the sink. Specifically, a connection between a destination plug and an input plug, and an isochronous channel assigned to the input plug are specified in the iPCR.

In the next step S8, the controller 1 sends a play command to the HDD 2, the source, through the IEEE-1394 bus 4, and sends a record command to the HDD 3, the sink, in a step S9. Responding to these commands, the HDD 2 starts a reproduction operation, a reproduced stream data is sent to the HDD 3 through the IEEE-1394 bus 4 by an isochronous packet, and the HDD 3 records the stream data sent through the IEEE-1394 bus 4 into a built-in hard disk.

When the stream data has been recorded as described above, the HDD 3, which serves as the sink, further executes processing shown in a flowchart in FIG. 30.

Specifically, in the first step S21, its system control section reads the number of the isochronous channel assigned to the input plug. In other words, the channel number of the isochronous channel assigned to the input plug to which stream data is input is read from the iPCR. In the next step S22, the system control section reads node_id of the transmitting node (in this case, the HDD 2) serving as the source from the packet header of the isochronous packet in which the stream data was transmitted.

In the next step S23, the system control section of the HDD 3 reads from the oPCR 41 of the HDD 2, the source, the payload size of the data transmitted to the channel number stored in the oPCR 41. The processing proceeds to a step S24. The system control section of the HDD 3 writes the payload size read in the step S23 into the payload information block in isochronous track object_type_specific_information. This payload size is also written into the oPCR of the unit of the HDD 3.

In the above description, data is transferred with the use of isochronous communication. When data is transferred with the use of asynchronous communication, entry_type is set to an asynchronous track and the same processing is performed. In this case, since the amount of data becomes very small, it is not necessary to store the payload size.

In the above description, entry_type is set to an isochronous track or an asynchronous track. A flag may be recorded which directly indicates that stream data has been recorded.

In the present specification, a system refers to the whole gear formed of a plurality of apparatuses.

Providing media for providing the user with a computer program which executes the above processing includes recording media, such as magnetic disks, CD-ROMs, and solid memories, and communication media, such as networks and satellites.

What is claimed is:

1. An information processing apparatus for transmitting and receiving information to and from another information processing apparatus connected through a bus, comprising:

first identification means for identifying data to be transmitted or received as stream data;

second identification means for identifying the size of the data identified by said first identification means, where the size is obtained by reading a payload size for the data identified by said first identification means; and management means for managing said first identification means and said second identification means.

2. An information processing apparatus according to claim 1, further comprising reading means for reading said first identification means from the another information processing apparatus when the stream data is received from the another information processing apparatus through the bus and recorded.

3. An information processing apparatus according to claim 1, further comprising obtaining means for reading said second identification means and for obtaining a bus resource necessary for transferring the stream data when the stream data is transmitted through the bus.

4. An information processing apparatus according to claim 1, wherein the bus is an IEEE-1394 high-speed serial bus.

5. An information processing apparatus according to claim 1, wherein said first identification means also identifies a transmission mode in the bus.

6. An information processing apparatus according to claim 1, wherein said first identification means has a hierarchical structure.

7. An information processing apparatus according to claim 1, wherein said second identification means has a hierarchical structure.

8. An information processing method for an information processing apparatus for transmitting and receiving information to and from another information processing apparatus connected through a bus, comprising:

a first identification step of identifying data to be transmitted or received as stream data;

a second identification step of identifying the size of the data identified in said first identification step, where the size is obtained by reading a payload size for the data identified in said first identification step; and a management step of managing identification performed in said first identification step and said second identification step.

9. A providing medium for providing a program which can be read by a computer and which makes an information processing apparatus for transmitting and receiving information to and from another information processing apparatus connected through a bus execute processing, said processing comprising:

a first identification step of identifying data to be transmitted or received as stream data;

a second identification step of identifying the size of the data identified in said first identification step, where the size is obtained by reading a payload size for the data identified in said first identification step; and a management step of managing identification performed in said first identification step and said second identification step.

* * * * *